Patented Jan. 14, 1941

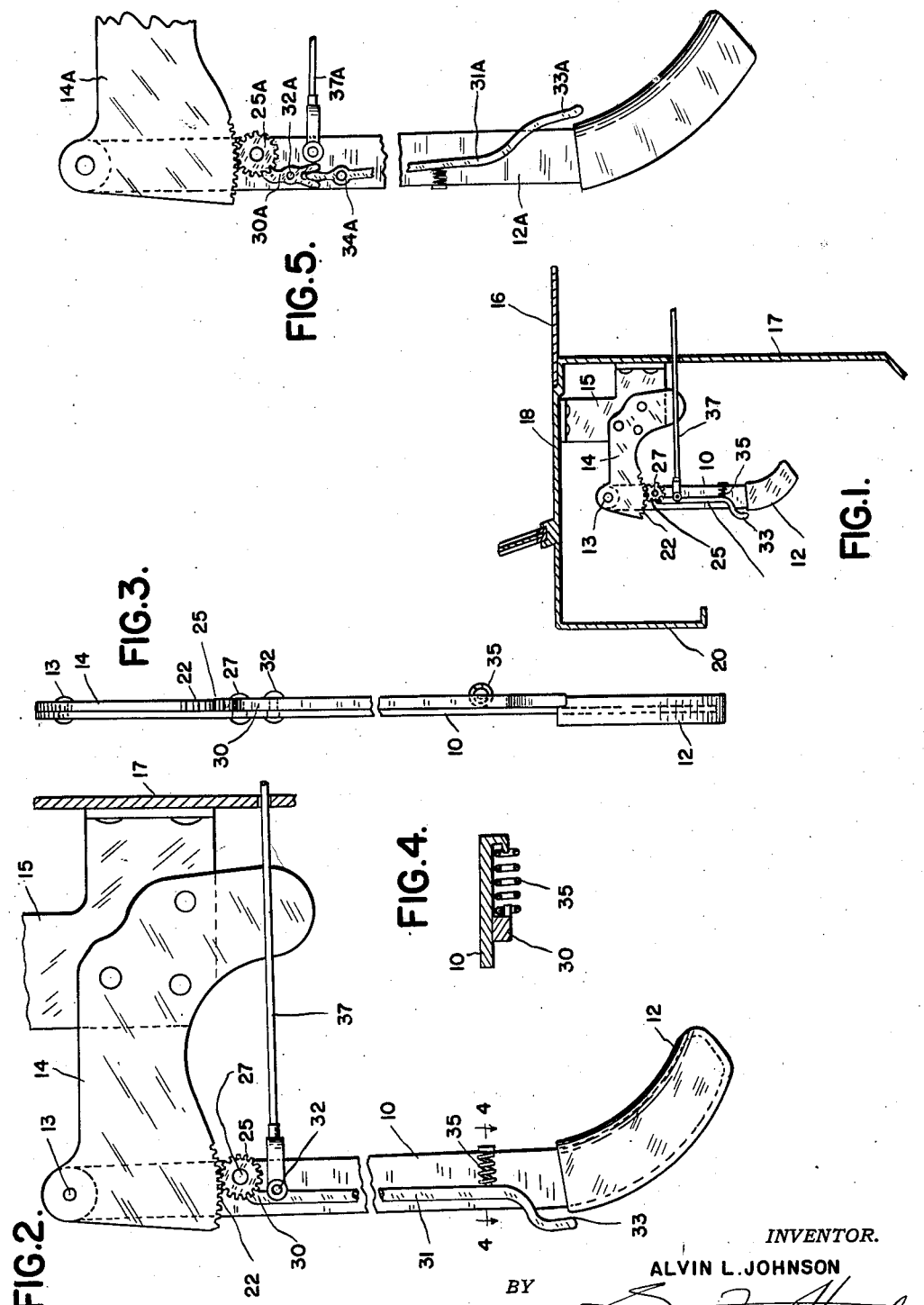

2,228,569

UNITED STATES PATENT OFFICE 2,228,569

HAND LEVER

Alvin L. Johnson, Ottawa Hills, Ohio, assignor to American Forging and Socket Company, Pontiac, Mich., a corporation of Michigan Application June 19, 1939, Serial No. 279,859

1 Claim. (Cl. 74—530)

This invention relates to hand levers for the operation and remote control of mechanism located at a point remote from the lever.

An important object of the invention is to provide such a hand lever mechanism, suitable, for example, for controlling the hand or emergency brakes of motor vehicles, which is very simple and inexpensive to manufacture and install, formed entirely of sheet metal, and the parts of which are so designed that the loads are distributed over a relatively great area, thereby reducing wear and prolonging the life of the mechanism.

Another object is to provide an improved pawl and ratchet mechanism of the character described incorporating a ratchet formed as a segmental rack, the pawl means including a gear journaled on the lever and rollably meshing with the rack, together with multi-toothed means for holding the gear when it is desired to lock the lever in place, the stresses thereby imposed being widely distributed, minimizing wear and danger of failure.

Other objects and advantages will be apparent from the following description, wherein reference is made to the accompanying drawing illustrating preferred embodiments of my invention and wherein similar reference numerals designate similar parts throughout the several views.

In the drawing:

Figure 1 is a side elevational view of a brake lever constructed in accordance with the present invention, showing the same installed in a motor vehicle which is illustrated, diagrammatically and fragmentarily, in vertical section.

Figure 2 is a side elevational view of the lever mechanism on a somewhat larger scale, with the lever arm centrally broken away.

Figure 3 is a front elevation of the lever assembly.

Figure 4 is a sectional detail of the spring mounting, taken substantially on the line 4—4 of Figure 2, and looking in the direction of the arrows; and Figure 5 is a view similar to Figure 2, but showing a somewhat modified construction.

Referring now to the drawing, the lever 10 will be seen to be formed of sheet metal, provided with a conveniently curved and enlarged hand grip portion 12 at its lower extremity, and pivoted at its upper end, as by means of pin 13, to a ratchet plate 14, which is in turn attached to and supported by a bracket 15, riveted or otherwise held to the dash and cowl portions 16—17 respectively of a motor vehicle. As shown in Figure 1, the lever may be so located behind the instrument panel 20 that the hand grip portion 12 is conveniently accessible directly beneath the same.

The ratchet teeth 22 formed upon the edge of plate 14 and concentric with the pivot 13 are in the form of gear teeth, and the pawl means includes a pinion 25 meshing therewith, rotatable upon a stub shaft 27 attached to the hand lever, and adapted to be stopped and freed at will by means of a pawl 30, also pivoted on the lever, as upon pin 32, and provided with a plurality of teeth adapted to engage the teeth of the pinion.

An integral continuation of the pawl extends downwardly to a point directly above the hand grip portion 12, where it is bent to provide a thumbportion 33. A spring 35 normally urges the pawl member to the released position, and it will be seen that the pin 32 by which the pawl is attached to the lever may also serve to connect the operating cable 37 which the brakes or other controlled mechanism (unshown) are operated.

In the somewhat modified construction shown in Figure 5, the downward continuation 31a of the pawl will be seen to be arranged upon the opposite side of the main lever, and adapted to serve as a trigger, engageable by the first finger of the operator to release the pinion and so allow the lever to swing when desired.

I am aware that the invention may be embodied in other specific forms without departing from the spirit or essential attributes thereof, and I therefore desire the present embodiment to be considered in all respects as illustrative and not restrictive; reference being had to the appended claim rather than to the foregoing description to indicate the scope of the invention.

I claim:

In combination with a lever, and a ratchet formed as a series of teeth arranged concentric with the fulcrum of the lever, means for releasably holding the lever against unwanted movement, comprising a toothed wheel journaled on the lever and meshing with said ratchet teeth, and means for holding the wheel against rotation, comprising a pawl having a nose section provided with a plurality of complementary formed teeth engageable and disengageable with the teeth of the wheel, said pawl having an integral extension section constituting a finger portion extending longitudinally of said lever to a position near the end thereof, pivot means for securing the pawl to the lever, spring means acting on said extension section to urge the same away from the lever and simultaneously to urge the nose section into yieldable engagement with the wheel, and means connected to said lever by said same pivot means for actuating desired apparatus.

ALVIN L. JOHNSON.